United States Patent
Zelenin (12) United States Patent (10) Patent No.: US 12,284,097 B1
(45) Date of Patent: Apr. 22, 2025

(54) NETWORK LINKER FOR TRACKING NETWORK TRAFFIC ACROSS A MULTIPLE PROTOCOL NETWORK

(71) Applicant: Morgan Stanley Services Group Inc., New York, NY (US)

(72) Inventor: Lev Zelenin, New York, NY (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/962,607

(22) Filed: Nov. 27, 2024

(51) Int. Cl.
  *H04L 9/40* (2022.01)
  *H04L 43/08* (2022.01)

(52) U.S. Cl.
  CPC .................. *H04L 43/08* (2013.01)

(58) Field of Classification Search
  CPC ........................................ H04L 43/08
  USPC ......................................... 709/224
  See application file for complete search history.

(56) References Cited

U.S. PATENT DOCUMENTS

| | | | |
|---|---|---|---|
| 7,523,462 B1 | 4/2009 | Nesamoney et al. | |
| 10,242,016 B2 | 3/2019 | Gorelik | |
| 11,528,283 B2 * | 12/2022 | Yadav | H04L 63/0227 |
| 11,941,065 B1 | 3/2024 | Li et al. | |
| 2008/0189277 A1 | 8/2008 | Meijer et al. | |
| 2008/0320075 A1 | 12/2008 | Livshits et al. | |
| 2010/0070448 A1 | 3/2010 | Omoigui | |
| 2013/0031331 A1 | 1/2013 | Cheriton et al. | |
| 2014/0358932 A1 | 12/2014 | Brown et al. | |
| 2015/0222557 A1 * | 8/2015 | Bhattacharya | H04L 45/22 370/237 |
| 2016/0217187 A1 | 7/2016 | Iesiev et al. | |
| 2019/0089725 A1 * | 3/2019 | Anachi | G06N 20/00 |
| 2020/0076584 A1 | 3/2020 | Steele | |
| 2020/0162503 A1 * | 5/2020 | Shurtleff | H04L 41/0883 |
| 2020/0177485 A1 * | 6/2020 | Shurtleff | H04L 67/535 |
| 2023/0412620 A1 * | 12/2023 | Crabtree | H04L 63/1416 |

* cited by examiner

*Primary Examiner* — Jude Jean Gilles
(74) *Attorney, Agent, or Firm* — PEARL COHEN ZEDEK LATZER BARATZ LLP (57) ABSTRACT

A device, system and method is provided for tracking network communication in a multi-protocol network. During the offline phase, a linkage graph may be generated representing network communication pathways of recorded messages comprising nodes representing network communication devices and edges representing direct communication paths pairwise connecting parent-child nodes over which the messages are transmitted. The linkage graph may be optimized by eliminating or reducing branching nodes. During a real-time online phase, for each new recorded message associated with a device node, tracing a communication pathway along edges of the optimized linkage graph by linking a sequence of nodes that connect sequential pairs of child-parent nodes extending from the device node to a root node. Simultaneous to linking each node to the device node, a network traffic metric for the linked node(s) may be accumulated to quickly and efficiently track the network traffic metric for the new recorded message.

20 Claims, 3 Drawing Sheets

NETWORK LINKER FOR TRACKING NETWORK TRAFFIC ACROSS A MULTIPLE PROTOCOL NETWORK

FIELD OF THE INVENTION

Embodiments of the invention relate to fast and efficient tracking of network communication traffic by linking different protocol messages that originate from the same root node as they travels across, and experience protocol changes in, a multi-protocol communication network. Embodiments of the invention further relate to, based on that tracking, diagnosing network traffic problems and automatically improving the flow of the network communication traffic, such as, automatically rerouting messages by redistributing network communication pathways to reduce traffic bottlenecks and decrease network latency.

BACKGROUND OF THE INVENTION

Over its lifetime, a communication message is typically transferred multiple times across a chain of multiple devices along a communication pathway in a communication network. In a multiple protocol communication network, those multiple network devices operate multiple different protocols. At each network traffic juncture in the chain, transferring the message from a parent device to a sequential child device, the child device may mutate the message from the incoming parent device's protocol to its different outgoing child device's protocol. As each message travels along the communication pathway, each (or multiple) devices in the pathway's device chain may change protocols and thus mutate the message, for example, as: initial message $M_0$ in protocol 0→mutated message $M_1$ in protocol 1→ . . . →mutated message $M_N$ in protocol N.

Each time a message's protocol is changed, its format and content are changed e.g., altering its protocol codes, syntax, identification values, etc. These protocol changes may make the child message unrecognizable as descending from the parent message. The path of a message may thus be broken each time its protocol is changed, making it difficult to track messages across protocol changing network junctures.

Tracking a message's full pathway over its lifetime may however be useful to measure network performance, such as, latency (e.g., time delays between adjacent network links), to diagnose and optimize traffic flow or fix system bottlenecks or network problems.

Conventional system's attempts to link these dissociated across these protocol switch junctures is impractical. Conventional systems use an inefficient brute force approach to search for linked messages by comparing each message to all other N network messages. A first message is compared to N−1 other messages to find its parent, the second message is compared to N−2 remaining other messaged, and so on, resulting in (N−1)+(N−2)+(N−3)+ . . . +1 comparisons to link all child-parent messages, which is equal to (n−1)*(n−2)/2 comparisons, which is on the order of $N^2$ operations, $O(N^2)$, to track all N network messages. Comparisons on a quadratic scale of the number of network messages $O(N^2)$, where N is typically thousands or millions of messages, are prohibitively time consuming rendering it inefficient and impractical to link network messages in real-time, and impossible to link network messages in real-time, in most real-world scenarios.

Accordingly, there is a longstanding need in the art for an efficient technique for linking network traffic in a multi-protocol network.

SUMMARY OF THE INVENTION

Embodiments of the invention solve this longstanding need in the art by providing a fast and efficient network linker to link network messages across inter-protocol device junctures in a multi-protocol network.

A device, system and method is provided for tracking network communication in a multi-protocol network. During an offline phase, communication circuits in the multi-protocol network may be tapped (e.g., actively or passively) to record communication messages. During the offline phase, a linkage graph may be generated representing network communication pathways of those recorded messages. The linkage graph may comprise generating an initial candidate arrangement of a plurality of nodes and a plurality of edges connecting those nodes pairwise. Each node may represent a distinct network communication device uniquely identified (e.g., by its unique IP address and Port, API, etc.) in the recorded messages. Each edge may connect a pair of parent-child nodes representing a potential direct communication path across which recorded messages are transmitted from a parent device to a child device. Communication paths are detected, even across protocol change junctures (e.g., mismatching header ID fields), when the parent and child messages have matching content (e.g., matching high cardinality fields in the message header and/or body) that are sequenced at the parent device directly prior to the child device. The linkage graph may be optimized by eliminating or reducing branching nodes that connect one node to multiple other nodes (e.g., by merging nodes, splitting nodes, or duplicating nodes). During a real-time online phase, for each new recorded message, a node representing a network communication device may be uniquely identified in the new message. A communication pathway may be traced by following edges along the optimized linkage graph linking a sequence of nodes that connect sequential pairs of child-parent nodes extending from the identified node to a root node. Simultaneous to linking each node to the identified node, a network traffic metric for the linked node(s) may be accumulated for and ascribed to the new recorded message to quickly and efficiently track its network traffic metric.

The linked network traffic metrics may be input into a machine learning model to output an altered linkage graph with an altered arrangement of nodes and edges that is predicted to improve network traffic metrics. The altered linkage graph may then be input into one or more network routers or gateways to automatically alter the communication paths of the plurality of network communication devices to (at least partially) follow communication paths represented by the altered arrangement of nodes and edges. Those altered communication paths may be trained and configured for reducing hot spots or bottlenecks of network traffic at network communication devices, reducing under-performing nodes representing network communication devices with substandard latency, and/or rebalance network traffic using adjusted weights for optimal transmission flow.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

Embodiments of the invention provide a fast and efficient network linker to track network communication traffic in a multi-protocol network. Embodiments of the invention may tap communication circuits to compile a repository of historical or current record communication messages. Tracing the flow of these recorded messages, a linkage graph is generated comprising nodes representing network communication devices and edges representing the messages' direct transmission paths therebetween. Network traffic metrics, such as latency, may be compiled for each node based on the messages. Once the message linkage paths for the network as a whole is mapped, for each new message received, the network linker may instantaneously trace the full communication pathway over its lifetime by following the edges of the linkage graph from the device's current (distal) node to its root (proximal) node. As the message is traced along this chain of linked nodes, the network linker may simultaneously accumulate or aggregate (as a direct or weighted sum) each linked node's network traffic metric(s) to instantaneously (in real-time) provide a measurement of the local and/or global network traffic metrics for the new message. Network traffic metrics may include, for example, message size, local message latency of direct parent-child node link, total latency aggregated from the current to the root node, message classification or priority, number of nodes/devices (from current to root) in the message's transmission pathway, etc.

The linkage graph may be created in an offline phase that traces historic messages by searching a quadratic scale of the number of messages $O(N^2)$ of combinations of parent-child node pairs to link the nodes for N messages. Once the nodes are linked in the linkage graph, each new message may be traced in an online phase by following a linear scale $O(N)$ of linkage graph edge pointers for N messages along the edges of the linkage graph from the current node to the new message's root node. Whereas the conventional brute force approach links new messages using a quadratic scale $O(N^2)$ of computations for N messages, embodiments of the invention reduce computations and increases computational speed and efficiency to a linear scale $O(N)$ of computations for N messages. For a single new message, the conventional approach traces the message using a linear scale $O(N)$ of computations, compared to a constant scale using embodiments of the invention. Embodiments of the invention thus significantly reduce computational load and accelerate computational time for linking network devices to track and monitor network traffic.

Embodiments of the invention may use this accelerated network traffic tracking technique to predict and automatically reconfigure network device connectivity that are predicted to optimize network traffic metrics, such as, reducing latency, to improve network traffic flow and communication efficiency. In some embodiments, the aggregated network traffic metrics may be input into a machine learning model trained to output an altered linkage graph with an altered arrangement of nodes and edges that is predicted to improve the network traffic metrics. Embodiments of the invention may automatically alter the communication paths connecting the network devices to follow the altered arrangement of nodes and edges, thus improving the flow of network traffic and network traffic metrics, such as, reducing local or global latencies, reducing numbers of devices in messages' transmission pathways, reducing message sizes, and reducing traffic bottlenecks.

According to some embodiments of the invention, a network linker analyzes network data and generates optimizations of the network. The network linker provides visibility into network operation, alerting, and reporting. The network linker uses pre-programmed protocols as well as artificial intelligence and machine learning to intelligently predict improvements to optimize the network. The optimizations can be automatically applied to reconfigure the network or provided to a human for review. A network may comprise a set of nodes and a set of edges, for example, modeled by a graph structure. The nodes may represent network devices and components (e.g., web applications, trading engines, routers, gateways, etc.). The edges may represent network traffic directly linking the nodes. A given communication message or transmission on the network traces a path through the nodes along the edges. The nodes of the network communicate in one of multiple protocols. A protocol may represent a language of communication, e.g., using key value pairs (e.g. FIX, OUCH, REST, SOAP, etc.). Each edge defines a direct communication link that transmits messages in a single parent protocol. Nodes that use multiple protocols may be split into multiple respective nodes each speaking only a single protocol.

Linkage may associate a current "child" messages at a child node device as originating directly from a "parent" message transmitted by a parent node device. The child message's content may be mutated compared to the linked parent message's content if the parent-child node devices use different protocols. The initial or original ancestor message from which the descendent chain of messages originate (outside or inside of the network) may be the "root" message at the root node device. A root message may have many child or descendent messages, each at a particular node and subsequently traversing a particular network edge. Linking parent-child or ancestor-descendent messages enables the network traffic metrics to be computed fast and efficiently based on knowledge of the history of a transmission. Network traffic metrics may include, for example, a number of nodes and edges the transmission traversed, a duration of time used to traverse each node and a total time duration or lifetime for the transmission, a size of the messages comprising a transmission, or any other metric relevant to tracking network traffic that is derivable from the transmission messages.

The recorded transmission messages may be obtained by tapping communication circuits in the multi-protocol network to record communication messages. Tapping communication circuits may include actively or passively obtaining the messages, for example, by installing physical hardware or software to actively copy the messages or their metadata or passively receive messages or their metadata from a centralized network device or from the individual network communication devices. Each transmission message may represent an edge, with a source node and a target node. Each message may include a set of fields formatted according to its protocol and a set of protocol-specific values for those fields. Linkage may be executed by applying a logical operation to the field values of pairs of messages. A simple linkage operation may use an equality relation, e.g., field X's value on parent message equals field Y's value on the child message (e.g., matching exactly, partially, within a margin of error, fuzzy, probabilistically, deterministically, non-deterministically, etc.). Linkage operations can be combined with logical AND and OR connectives to generate more complex linkage rules. These linkage rules can be combined with literal values in place of message fields, e.g. parent field X value='A'. These linkage rules can be combined with ranking logic, e.g. sort all messages of the parent node where field X='A' by time, do the same for field Y='B' for the child node, then associate those with the same sorted order for each node as parent/child pairs. These linkage rules can be combined with relational constraints, e.g. parent field X's value is less than or equal to child field Y's value. Cumulatively, all the linkage rules for a given network may define the "linkage logic" of that network (e.g., a combination of first-order logic for efficiency).

Once the linkage logic is defined, parent/child/root relationships may be computed to generate the linkage graph, after which the primary network traffic metrics are computed for each node and/or edge, then the network traffic metrics are processed separately. Statistics may be calculated on the metrics, e.g. 95'th percentile latency of node X.

Machine learning, e.g. regressions, cluster analyses and/or outlier detection models, may generate an altered linkage graph (e.g., alterations to the linkage graph) to optimize one or more of the network traffic metrics and/or statistics thereof. Artificial intelligence may be used to generate reports using the statistical results and can be used to automatically generate and execute code and configuration modifications to the software running on the node devices to effect the network changes generated by the machine learning model. Network communication circuits, routers and/or gateways may alter communication paths between network devices to (partially or fully) follow the predicted communication alterations. A visualization of the altered linkage graph or the predicted (or actual) optimized network traffic flow associated therewith may be generated and displayed to network operators for review (e.g., to accept or reject the proposed alterations). The system may iteratively perform these predictions and execute real-world network communication alterations, e.g., in real-time. As the network changes, the system detects those changes and proposes new linkage rules to integrate the changes, or the user defined configurations, are updated and provided to the system to automatically implement those changes.

Figure 1:
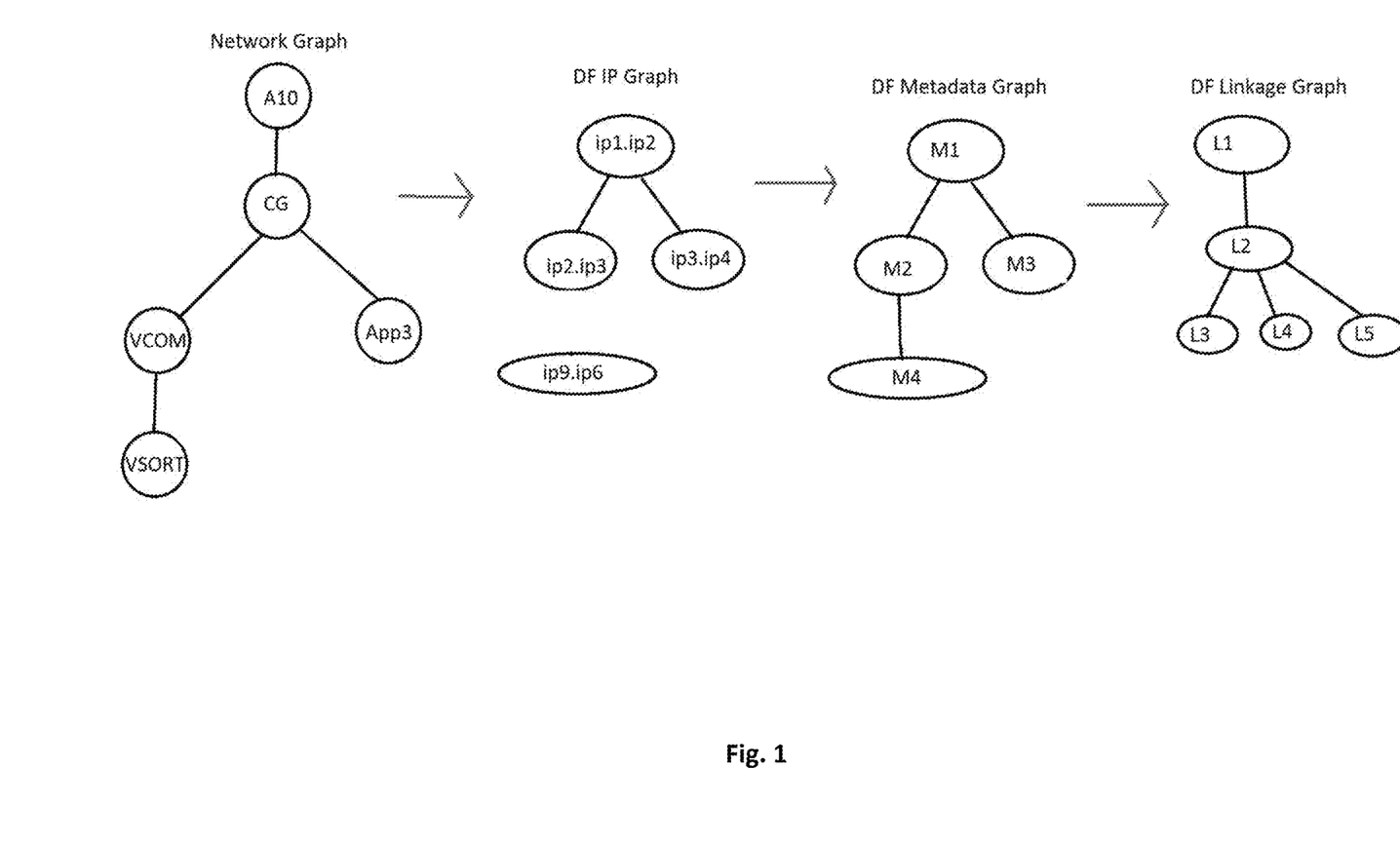
FIG. 1 depicts schematic illustrations of various types of linkage graphs, in accordance with various embodiments of the invention.

Reference is made to FIG. 1, which are schematic illustrations of various types of linkage graphs, in accordance with various embodiments of the invention.

A "Network Graph" depicting the network architecture by nodes that represent communication devices and edges that represent direct transmission paths therebetween. Communication devices may be distinct devices, components in the same device, engines, etc. (e.g., identified by names, IDs, addresses, etc.). A network tapping device may be installed at each (of all or a subset of) network device to identify messages transmitted along communication path edges between pairs of node devices. The network tapping device may compile the recorded communication messages in operation 200. Additionally or alternatively, application logs, metadata or copies of the messages may be retrieved from the parent or child device memor(ies).

The edges of the Network Graph may be transformed to nodes in IP Graph, Metadata Graph, and Linkage Graph, such that each node represents the potential direct communication path from a parent device to a child device. Those nodes may be connected by edges sequencing or ordering the potential direct communication path nodes.

A "IP Graph" comprises nodes each representing the edges of the Network Graph. The nodes may be connected by edges, e.g., representing socket information (e.g., source and target IP addresses and port, vlan, dc, etc.). Some nodes are not connected because the source IP/port of the child is not equal to the target IP/port of the child. This is due to multicast and load balancing/routing. For example, if multicast routing protocols are used, the sender may send to an IP address which is used to route multiple traffic pathways (so the target of each edge may not refer to a specific IP/port that is a node on the graph).

A "Metadata Graph" has the same nodes as the IP Graph. The Metadata Graph may use a metadata ID (MID) to ensure all sources and targets match, thus resolving any disconnectedness in the IP graph by connecting all the nodes using IP addresses and ports as node definitions and ensuring that all messages in every node have IP/port references that are nodes in the graph. In the multi-cast protocol, this would resolve multi-cast targets into the actual IP/ports of the hosts to which the traffic was routed.

A "Linkage Graph" comprises nodes each representing linkage identities (e.g., on top of MID) connected by edges (e.g., each representing PLINK/CLINK pairs). The Linkage Graph uses a linkage ID (LID) to create nodes that have unique PLINK/CLINK values that form connected graphs. There may be several linkage graphs derived from one metadata graph. For example, Node1 may be defined by field1=A and field2=B, node2 defined by field1=1 and field2=2, and the edge between them defined as parent.node=node1 and child.node=node2 and parent.field15=child.field35.

Other types or architectures of linkage graphs and/or representations of nodes/edges may be used and multiple linkage types may be used concurrently.

As used herein, the Network Graph type comprising device nodes and communication path edges is considered herein to include other representations of the same information, e.g., the IP Graph, Metadata Graph, and Linkage Graph, and any other linkage graph type that uniquely maps (one-to-one) to the Network Graph.

Figure 2:
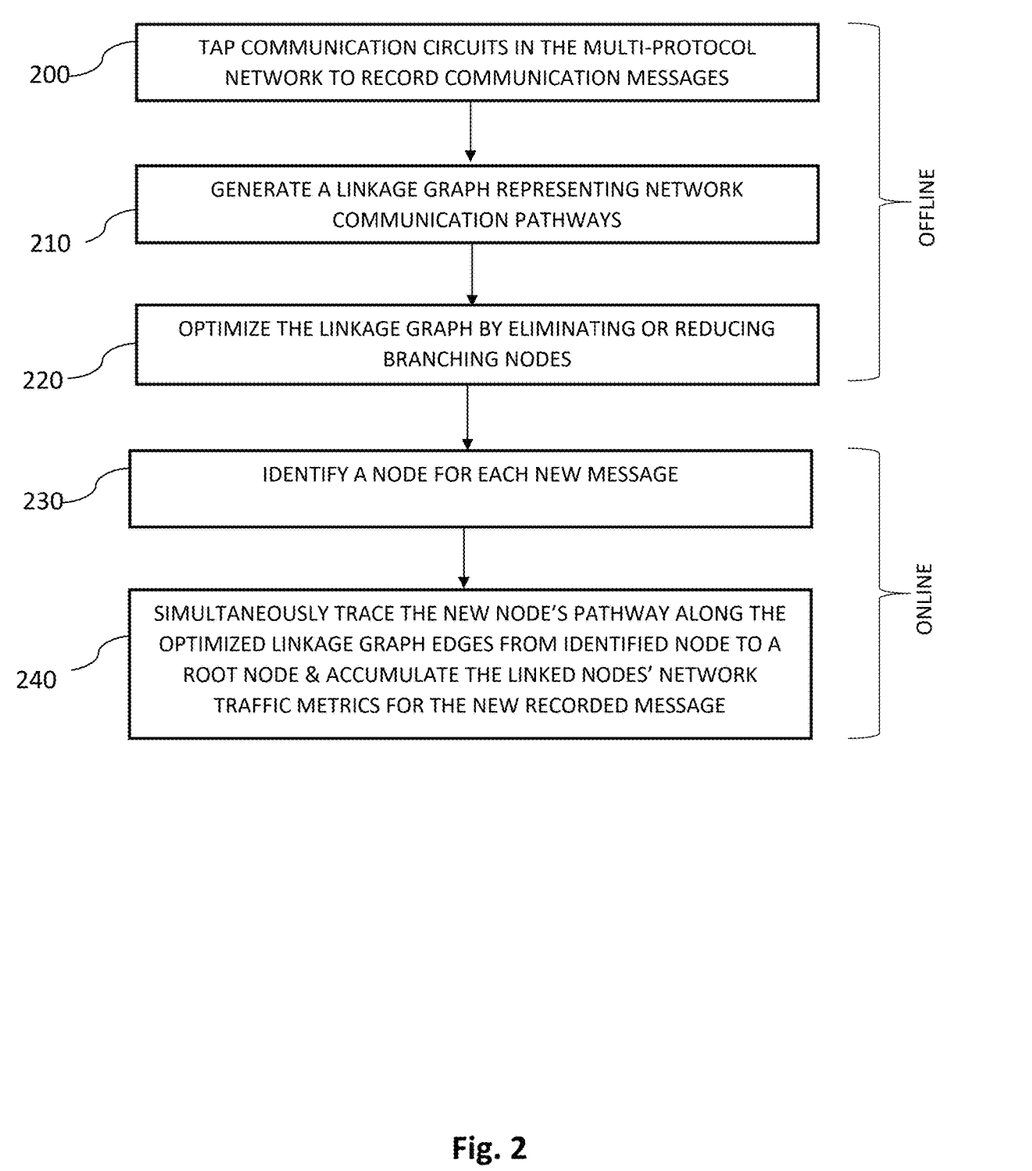
FIG. 2 is a flowchart of a method for a network linker tracking and improving network communication in a multi-protocol network, in accordance with some embodiments of the invention.

Reference is made to FIG. 2, which is a flowchart of a method for a network linker (e.g., computing device 100 of FIG. 3) tracking and improving network communication in a multi-protocol network, in accordance with some embodiments of the invention. The network linker may execute linkage logic (e.g., executable code 125 of FIG. 3) to cause a processor (e.g., controller 105 of FIG. 3) to perform the following operations.

In operation 200, in an offline phase, a processor may tap communication circuits in the multi-protocol network to obtain recorded communication messages. Tapping communication circuits may include actively inserting physical eavesdropping/spyware devices, passively receiving copies of messages and/or their metadata recorded by network devices, and/or any method of obtaining the recorded communication messages. The recorded communication messages analyzed in the offline phase may be historic (e.g., past messages from a previous time, such as the past month) or recent/contemporaneous with the current new message analyzed in the online phase.

In operation 210, in an offline phase, a processor may generate a linkage graph representing network communication pathways. The linkage graph may have an initial candidate arrangement of nodes and edges. Each node may represent a distinct network communication device (e.g., device components, software engines, such as APIs) uniquely identified (e.g., by its unique IP address and Port, API, etc.) in the recorded messages. Each edge may connect a pair of parent-child nodes representing a potential direct communication path from a parent device to a child device. The potential direct communication path may be generated for each recorded messages transmitted from parent device to child device (sequenced at the parent device directly prior to the child device, with no such intervening paths) that is identified to have matching content (e.g., matching high cardinality fields within a margin of error, such as, matching data content, matching data type, etc.). This representation of device nodes and communication path edges (e.g., Network Graph of FIG. 1), as used herein, includes any linkage graph type uniquely and/or injectively mapped therefrom (e.g., IP Graph, Metadata Graph, and Linkage Graph of FIG. 1).

In operation 220, in an offline phase, a processor may optimize the linkage graph by eliminating or reducing branching nodes that connect one node to multiple other nodes. Branching nodes may be removed by merging nodes, splitting nodes, and/or duplicating nodes to convert branching nodes to non-branching nodes connecting one node to a single one other node.

Offline operations 200-220 may be iteratively repeated by using a new set of tapped recorded messages to update the linkage graph, for example, periodically, upon receiving the new set of messages, or triggered by an event, such as, a network error, failure or substandard performance (e.g., below threshold average latency for one or more devices).

In operation 230, in an online phase, a processor may receive a stream of new recorded messages and process each new recorded message in real-time (e.g., in real-time, concurrently or soon after those messages are transmitted through the network). For each new recorded message, the processor may identify a node representing a network communication device (or an equivalent node-type) uniquely identified in the new message. A device identifier may be retrieved from the message header or metadata.

In operation 240, in the real-time online phase, for the new recorded message, the processor may simultaneously trace its communication pathway along edges of the optimized linkage graph and accumulate a network traffic metric of each linked node to the network traffic metric for the new recorded message. The processor may trace the communication pathway by linking a sequence of nodes that connect sequential pairs of child-parent nodes extending from the identified node to a root node. The processor may trace the communication pathway in batches in parallel, e.g., tracing multiple (all) nodes' single preceding generation parent's edge in each single processing cycle, or tracing all ancestor edges back to the root node in each single processing cycle. To trace each node to its edge-connected parent node, if the communication pathway does not branch at the node, the processor may link the node by following a unique graph pointer to a single parent node. If the communication pathway branches at the node to multiple other parent nodes indicated by a multi-node pointer thereto, the processor may link the node by retrieving from a lookup table a unique pointer to a single parent node. If a node can not be associated with a single parent node, the processor may link the node by searching all potential parent nodes in the linkage graph for recorded messages with matching content that are sequenced at the parent device directly prior to the device associated with the node.

In an online or offline phase, a processor may input the linked network traffic metrics from operation 240 into a machine learning model to output an altered linkage graph with an altered arrangement of nodes and edges that is predicted to improve network traffic metrics.

In an online or offline phase, a processor may input the altered linkage graph into one or more network routers or gateways to automatically alter the communication paths of the plurality of network communication devices to (at least partially) follow communication paths represented by the altered arrangement of nodes and edges. The altered linkage graph may be optimized to, and when implemented may improve the network traffic flow by reducing hot spots or bottlenecks of network traffic at network communication devices, reducing underperforming nodes representing network communication devices with substandard latency, optimize flow to rebalance network traffic by assigning weights to the altered linkage graph, or otherwise improve the accumulated network metrics for one or more (all) nodes.

Figure 3:
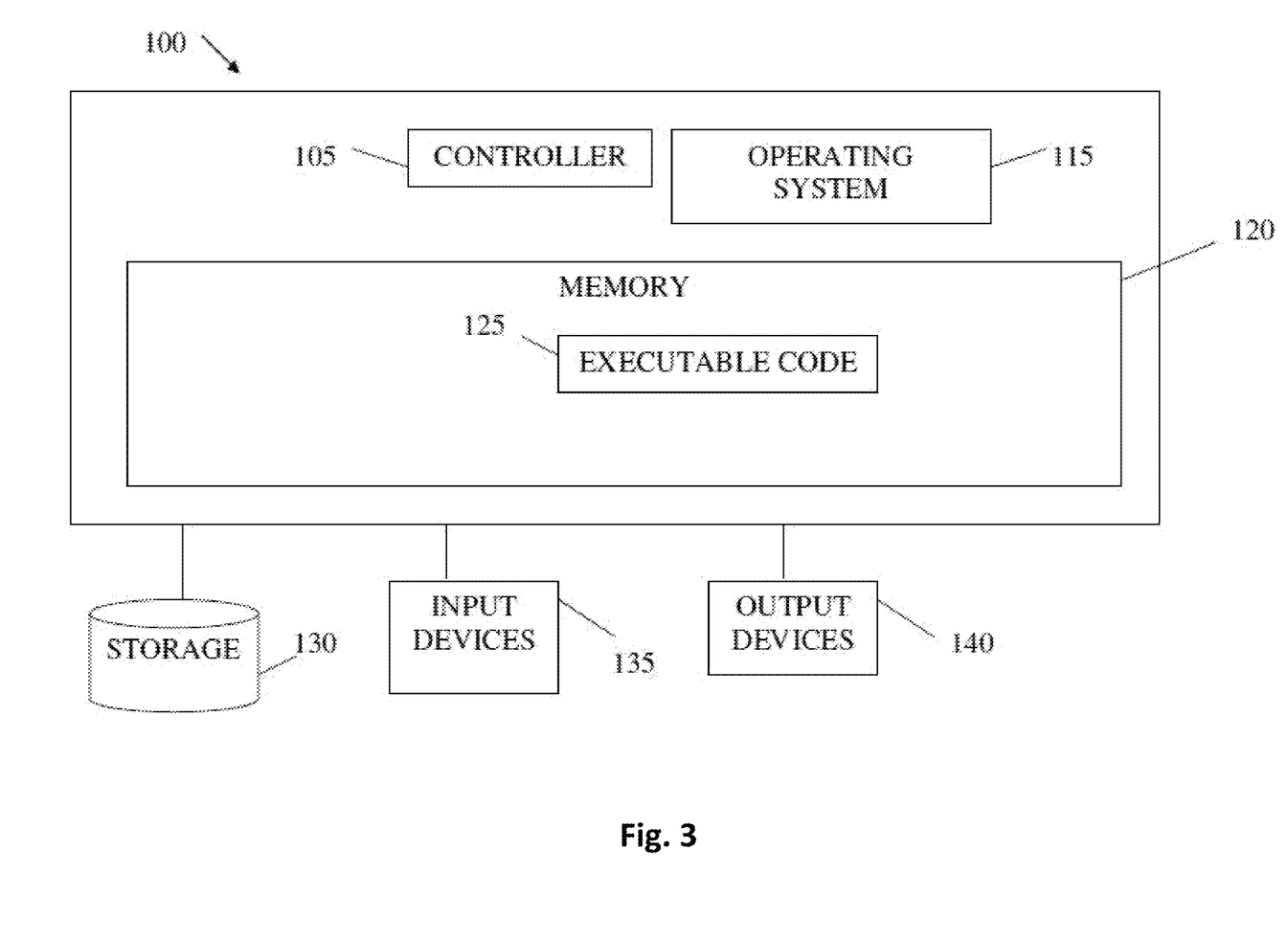
FIG. 3 schematically illustrates a system for tracking network communication in a multi-protocol network, in accordance with some embodiments of the invention.

Operations described in reference to FIG. 2 may be executed using hardware devices described in reference to FIG. 3 (e.g., one or more processor(s) or controller(s) 105 of FIG. 3) using data stored in a memory (e.g., one or more memory unit(s) 120 and/or storage 130 of FIG. 3). Additionally or alternatively, other devices may be used. Other operations or orders of operations may be used than in FIG. 2. In some embodiments, various operations may be combined, performed in parallel or in sequence, or otherwise permuted. For example, the offline phase (operations 200-220) may be executed before (e.g., using historic messages), during (e.g., using contemporaneous messages), or after (iteratively updated) the online phase (operations 230-240).

In one embodiment of the invention, the network linker (e.g., one or more processor(s) or controller(s) 105 of FIG. 3) may create an initial linkage graph comprising an initial candidate arrangement of nodes connected by edges based on the routing of the recorded communication messages. In some embodiments, the recorded communication messages are collected from the network and the network linker autogenerates the linkage logic. Additionally or alternatively, the initial linkage graph may be created by a user supplied definition of nodes and linkage rules in a configuration language provided. To autogenerate the initial logic, the network linker may:

1. Create a partition of the sample data into disjoint subsets of data using:
    a. a partitioning logical predicate—e.g. each node is defined by having the same IP address and Port which is common to all messages for that node and is distinct from all other IP/ports of messages of different nodes; and
    b. a sequencing logical predicate—e.g. a timestamp or a sequence number where a given parent message will always have a smaller value for this field than the value for the field of its child message, wherein
    c. the network linker examines the data types and field values of the sample data set to generate a list of possible partitioning and sequencing logics, and then selects the linkage logic that is most coherent—e.g. the partitions categorize all the network data as being nodes of a linkage graph.
2. Create a linkage logic connecting the subsets defined above:
   a. for each node from step 1, the network linker may search for fully-populated fields that have high cardinality (e.g., above threshold number of unique values), and checks if the values of parent nodes match the values of child nodes.
   b. if the above does not result in unique matches, the network linker applies a sorting with respect to the sequence field mentioned above.

The network linker may generate an optimized linkage graph, for example, by:
Based on the graph from step 1, checking if it conforms to constraints which lead to optimal operations by:
  if there is no branching in the graph (e.g., a node can not send a message to multiple other nodes indicated by multiple edges), the network linker may select pointer based operations for linkage; or
  if there is branching of nodes in the graph:
    a. alternate node definitions are considered (e.g., using more specific nodes, splitting nodes, etc.). A process similar to 1., which does not have branches. If these exist they are used instead of initial node definitions in a pointer based operation. Methods to generate alternates include merging nodes, splitting nodes (e.g., with branches), and duplicating nodes (e.g., while marking the duplicates as hidden).
    b. if no alternate node definitions exist and branching is due to node multi-children links, the network linker may use both a pointer and a look-up table combination operations for linkage.
    c. if branching is of parent nodes or due to multi-edges (e.g., multiple linkage logics for a node that cannot be split as in step a.), the network linker may count the number of records in this category and:
      if the count is small, introduce duplicate messages (e.g., while marking the duplicates as hidden) and use a pointer based operation; or
      if the count is large, the network linker may use a non-pointer based join operation for linkage (e.g., if no better alternative is possible for the given network data).

The network linker may create linkage logic, for example, as follows:
With the linkage operations selected, the network linker may generate the code programmatically to implement the following example operations.
  Pointer based operations (e.g., for a graph w no branching):
    scan every message, deriving a pointer value that will match the pointer value derived on the parent message;
    follow these pointers to find a parent for each child and calculate adjacency metrics like latency of node; and
    follow all parent pointers to their respective parents, until the root is identified for the message.
  This implementation may use a distributed hash equi join of two tables, e.g.: take data stored distributed in independent nodes to parallelize. Redistributed across a new way that configures parent/child on the same node.
  Pointer with lookup table operations (e.g., if nodes branch (no splitting/merging), create look up table listing multiple possible options and analyze each option to determine which one is correct):
    scan every message, deriving a pointer that will match multiple possible parent messages, each of which is from a different node;
    look up the node of the actual parent in the lookup table, thereby selecting the unique parent and populating a correct parent pointer; and
    follow all parent pointers to their respective parents, until the root is identified for the message.
  This implementation may use a distributed hash equi join of three tables.
  Non pointer operations (scanning $O(N^2)$ messages):
    for each message, scan each other message, apply each linkage rule in a sequence until it is either identified as the parent or all rules have been tried.
  This implementation may use a time restricted distributed broadcast join.

The network linker may calculate network traffic metrics and statistics thereof for the multi-protocol network, for example, as follows:
  Using the generated linkage logic, the network linker may compute linkage on the network data:
    on a continuous basis for newly generated network traffic; or
    for a large dataset of previously captured historic network traffic.
  Using the linked network data, the network linker may calculate metrics simultaneous to tracing parent pointers along the linkage graph to identify parent nodes and root nodes, e.g., including:
    The user can specify a metric using predicate logic—e.g. message size if it's a field in the data, message latency as parent time-child time, path latency as sum of message latencies, etc.
  Using calculated metrics, the network linker may derive statistical data and use machine learning to generate reports and suggest optimizations.
  Hot spots in the network relative to the metric may be identified.
  Underperforming nodes may be identified.
  Median metrics may be used to assign weights to the network graph, allowing for optimal flow operations to be used to suggest how to rebalance network traffic.
  A user can specify custom metrics of interest if they are available as fields on messages—e.g. a network would split flow up by client to see which clients route the most traffic or are slowest.
  Outliers and statistical profiling is available for all nodes to use as an early warning detection system as well as to suggest optimizations.
  Using AI, the findings may be summarized into a report.

The network linker may optimize the user's network, for example as follows:
  Network operators are given suggested optimizations and potential areas of improvement and investigation.
  if the network supports it, the results are fed directly to routers and gateways to redistribute flow more efficiently.
  Other operations may also be used.

Embodiments of the invention provide a network linkage analyzer with a platform for multi-protocol network analyses for software engineers, infrastructure operators, and business analysts. The network linkage analyzer is a general solution to a wide range of problems that are common to environments found wherever large-scale computer networks are used as a basis for a software ecosystem. At its core is a linkage engine capable of grouping or linking messages in the network into groups and thereby allowing crucial statistical metrics to be calculated (e.g., latency between grouped messages and between groups of messages, among others). These statistics may be used in such environments to measure performance, provide information to substantiate technical theories, drive business decisions, and detect issues as or even before (by employing AI and machine learning models) they occur.

Network Linkage Analyzer Components:

Data Acquisition Components: The data acquisition components of the network linkage analyzer may capture binary network messages and decode them from a myriad of protocols, e.g., into human-readable text. Supported component versions include Corvil appliances, a custom decoder provided by the user, and file based network capture. For web API applications, this component may decode the common API protocol types, such as, e.g., REST, GraphQL, SOAP, WebSocket, Socket, SSE, gRPC, MsgPack, etc. For electronic trading, this component may decode common trading protocols such as, e.g., FIX, OUCH, SAIL, BOE, iLink, Pillar, SBE, Millenium, UTP, T7 ETI, MTESRL-TSMR, Plaza2, Arrowhead, TMP, OMEX, OCG, etc.

Data Routing: The data routing component of the network linker may be responsible for collecting raw network data and making it available to the data processing layer in a resilient, robust, and efficient manner. Supported components include, e.g., Apache Kafka and file based network capture.

Data Processing: The data processing component of the network linker may calculate linkages and statistical metrics (e.g., latency). Supported components include, e.g., SingleStore database and Apache Spark.

Linkage Engine: The linkage engine component of the network linker may link the network. The linkage engine takes either a sample data set or a user's configuration and produces a series of programs for the data processing component that implements the system. The linkage engine then dispatches the code to the data processing component, monitors progress, and notifies the rest of the system when data is ready. The linkage engine computes different metrics (e.g., per user configuration) such as latency, group counts, branch factor of network paths, size of paths of messages, traffic amounts, and others for the latency groupings defined by the user such as per session, per client, per server, per server group, and others. The linkage engine saves the data produced by the data processing component to the data storage component in a format that is use-able by the rest of the system. The linkage engine may be implemented, e.g., in Python.

Several non-limiting use cases for linking messages in a multi-protocol network include, for example, web applications and electronic trading, discussed below.

Web Applications:

Internet based applications frequently employ a standard design whereby returning the user-requested web page is achieved by the coordinated action of multiple servers communicating with one another over a computer network. This coordination is mediated by a set of application programming interfaces (APIs) which may be remote function calls, e.g., sent over TCP or UDP. API calls use various protocols that may be as diverse as the applications which implement them, and beyond the standard API standard syntax each system typically defines a set of APIs specific to its purpose.

One example where network APIs are ubiquitous is information website, such as for weather forecasting. A forecaster shows users a weather forecast by sending an API call to a server housing that information, shows in-depth predictions, such as, daily, weekly or monthly forecasts of the currently displayed regions with another API call, shows weather simulations, such as, cloud or pressure fronts with another API call, and many more. Indeed, the entire internet and all its myriad functionality operates as a set of servers communicating over a network by passing specialized messages back and forth until the desired result is achieved.

In all these Web API based environments, the network linker provides the benefit of measuring network traffic flow metrics such as the latency of every message in the network, groups them by all the messages which belong to a single internet session, groups them again by relevant business dimension (such as by the specific API, or by country where the user is connecting from, or by internal vs external service (e.g. a call to the weather station vs a call to the application's own server), and many more), and then computes the metric(s) of interest (e.g., latency, count of messages, size of message, etc.) for each group. This information may then be fed to AI and machine learning models, disseminated via spreadsheet reports, displayed in a browser as a dashboard for operators and engineers, and/or aggregated for the data provider as evidence of the company's usage.

Electronic Trading:

Electronic trading of securities, such as, equities, fixed income, or commodities (or derivative contracts with these as underliers) is typically accomplished by coordinated activity of many servers connected with a computer network which can collectively be called a 'trading plant'. A trading plant is a heterogeneous mix of software and hardware which ultimately receives trades from clients (or originates its own trades), transacts them on public or private exchanges, and reports on the status of each trade both to clients and regulators. A typical set up for a large Wall Street firm trading globally includes thousands of servers running in data centers across the globe with proximity to major stock exchanges (e.g. New York City, London, etc.) and a typical trade will involve electronic messages being passed between a dozen or more of these servers. A large firm may offer access to many different exchanges, each of which offer different trading services (e.g. defining the types of trades allowed on that exchange, how those trades are processed, etc.), and so different trade messages will trace a different path through the network, depending on what functionality they require to be transacted upon. The network may track traffic metrics, such as, the latency of these trades, the time it takes for the trades to progress through the network and ultimately to be filled or rejected. A slow electronic trading plant produces poor outcomes for its customers because it does not respond to changing market conditions as fast as its competitors and may even be susceptible to being 'front run'.

The network linker for electronic trading may measure the latency of the network by calculating the latency of every message relative to its previous linked parent message in the trade communication pathway. The network linker then groups all these related messages together to form a single trade pathway. Using these groupings, the network linker then calculates the latency not just of adjacent messages but between every pair of messages in the trade pathway, allowing one to see the total latency of the trade in its entirety as well as to see how long each server node took to process its portion of the trade pathway. The network linker may execute this process in near real-time, e.g., so that a few seconds after a trade has transited the network, its messages are grouped and its latency is calculated. This information may be gathered into a series of reports, graphical user interfaces, and alerting systems based on the network design. Armed with this information, the trading firm can determine if a certain client is experiencing poor performance, if a certain server is handling a certain type of trade slower than expected, if the new servers recently added justify their cost from a performance standpoint, and many other insights which hinge on knowing the latency or other metrics of every network participant aggregated across the network.

Software Overview

The network linker may be a software system, e.g., installed as a bundle of services. A default configuration may be provided which works for all or most use cases, and specialty modes that also makes it possible for a user or automated system to select one of several alternative configurations, such as a choice of which components to use.

The initial installation of the product may involve specifying via a configuration file (e.g., or installation 'wizard' program) the user's environment, including the network topology to be analyzed, metrics of interest to be calculated, which users have permissions to access the data, and which servers the network linker is configured to use, data retention periods, etc. The software package may also include either a specification of the linkage rules or provides a sample CSV file of data for which the network linker is configured to attempt to auto-generate linkage rules.

The network linker may initiate by executing an initial processing phase, e.g., only required during installation, where it computes the linkage rules (e.g., even in cases where the rules are specified by the user, the network linker may change them to optimize efficiency and verify that they are consistent, non-contradictory, and complete) and auto-generates the code for the linkage engine to use for the user's data. The network linker may also set up the processes to be run on the servers indicated by the user.

During standard operation, the network linker may run concurrently while the network is operating. Data may be captured into the system by the data acquisition layer (e.g., default component may be a set of installed Corvil appliances on the network, which the network linkage analyzer constantly polls to get new data), then routed through the data routing layer (e.g., default component is a Kafka cluster) into a data processing layer (e.g., default component is a SingleStore database) and finally stored in a data storage layer (e.g., default component is a SingleStore database). The linkage engine may issue real-time commands to the data processing layer, which may execute the commands, compute linkages, and compute statistical metrics. The linkage engine may analyze the network topology and auto-generate the code for the component the user has chosen to install. For example, if the default SingleStore component is installed, the linkage engine may generate a series of SQL programs which calculates the linkage. If another supported component, e.g., Apache Spark, is used, the linkage engine generates a Python pyspark program which would compute linkages using a Spark cluster.

Finally, a web browser based graphical user interface (e.g., a default component may be a GUI that comes with the product built in 3Forge) displays relevant information to users, sends out alerts, visualizes data with graphs, and provides users with a bespoke reporting feature where they can create customizable dashboards. Users can also see the linked data in the processing data layer and if the default SingleStore component is installed they can run arbitrary SQL to create customized views of their data.

An machine learning component may also read the data storage layer and perform anomaly detection to predict issues in performance as well as provide business specific artificial intelligence (for example in electronic trading it can perform unsupervised learning to determine the best predictors of trade fill rates).

The network linker provides a new universal and centralized layer that unifies all different protocols across the multi-protocol network.

Reference is made to FIG. 3, which schematically illustrates a system for tracking network communication in a multi-protocol network, in accordance with some embodiments of the invention. Computing device 100 may be a network linker and may include a controller or computer processor 105 that may be, for example, a central processing unit processor (CPU), a chip or any suitable computing device, an operating system 115, a memory 120, a storage 130, input devices 135 and output devices 140 such as a computer display or monitor displaying for example a computer desktop system. Each data structure, programming code, algorithm, and/or equipment discussed herein may be or include, or may be executed by, a computing device such as included in FIG. 3, although various units among these may be combined into one computing device. Computing device 100 may be operatively connected to a network of communication devices.

Operating system 115 may be or may include code to perform tasks involving coordination, scheduling, arbitration, or managing operation of computing device 100, for example, automated real-time tracking of network traffic, predicting improved network configurations and altering the network communication pathways to improve network traffic flow. Memory 120 may be or may include, for example, a Random Access Memory (RAM), a read only memory (ROM), a Flash memory, a volatile or non-volatile memory, or other suitable memory units or storage units. Memory 120 may be or may include a plurality of different memory units. Memory 120 may store for example, instructions (e.g. code 125) to carry out a method as disclosed herein, and/or data such as low-level action data, output data, etc.

Executable code 125 may be any application, program, process, task or script. Executable code 125 may be executed by controller 105 possibly under control of operating system 115. For example, executable code 125 may be one or more applications performing methods as disclosed herein. In some embodiments, more than one computing device 100 or components of device 100 may be used. One or more processor(s) 105 may be configured to carry out embodiments of the present invention by for example executing software or code. Storage 130 may be or may include, for example, a hard disk drive, a floppy disk drive, a Compact Disk (CD) drive, a universal serial bus (USB) device or other suitable removable and/or fixed storage unit. Data described herein may be stored in a storage 130 and may be loaded from storage 130 into a memory 120 where it may be processed by controller 105. Storage 130 may store recorded raw audio files of calls.

Input devices 135 may be or may include a mouse, a keyboard, a touch screen or pad or any suitable input device or combination of devices, which may be operated by for example a compliance officer. Output devices 140 may include one or more displays, speakers and/or any other suitable output devices or combination of output devices. Any applicable input/output (I/O) devices may be connected to computing device 100, for example, a wired or wireless network interface card (NIC), a modem, printer, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

It may be appreciated that "real-time" may refer to instantly or, more often, at a small time delay of, for example, between 0.01 and 10 seconds, during, concurrently, or substantially at the same time as.

In the foregoing description, various aspects of the present invention are described. For purposes of explanation, specific configurations and details are set forth in order to provide a thorough understanding of the present invention. However, it will also be apparent to persons of ordinary skill in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

The aforementioned flowchart and block diagrams illustrate the architecture, functionality, and operation of possible implementations of systems and methods according to various embodiments of the present invention. In this regard, each block in the flowchart or block diagrams may represent a module, segment, or portion of code, which may comprise one or more executable instructions for implementing the specified logical function(s). In some alternative implementations, the functions noted in the block may occur out of the order noted in the figures or by different modules. Unless explicitly stated, the method embodiments described herein are not constrained to a particular order or sequence. Additionally, some of the described method embodiments or elements thereof can occur or be performed at the same point in time. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments of the invention may include an article such as a non-transitory computer or processor readable medium, or a computer or processor non-transitory storage medium, such as for example a memory (e.g., memory unit(s) 120 of FIG. 2), a disk drive, or a USB flash memory, encoding, including or storing instructions, e.g., computer-executable instructions, which, when executed by a processor or controller (e.g., 105 of FIG. 2), carry out methods disclosed herein.

In the above description, an embodiment is an example or implementation of the inventions. The various appearances of "one embodiment," "an embodiment" or "some embodiments" do not necessarily all refer to the same embodiments. Although various features of the invention may be described in the context of a single embodiment, the features of embodiments may also be provided separately or in any suitable combination. Conversely, although the invention may be described herein in the context of separate embodiments for clarity, the invention may also be implemented in a single embodiment. Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

The descriptions, examples, methods and materials presented in the claims and the specification are not to be construed as limiting but rather as illustrative only. While certain features of the present invention have been illustrated and described herein, many modifications, substitutions, changes, and equivalents may occur to those of ordinary skill in the art. It is, therefore, to be understood that the appended claims are intended to cover all such modifications and changes as fall with the true spirit of the invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Different embodiments are disclosed herein. Features of certain embodiments may be combined with features of other embodiments; thus certain embodiments may be combinations of features of multiple embodiments.

The invention claimed is:

1. A method for tracking network communication in a multi-protocol network, the method comprising:

In an offline phase:
 tapping communication circuits in the multi-protocol network to record communication messages;
 generating a linkage graph representing network communication pathways comprising generating an initial candidate arrangement of a plurality of nodes each representing a distinct network communication device uniquely identified in the recorded messages and generating a plurality of edges each connecting a pair of parent-child nodes representing a potential direct communication path from a parent device to a child device identified by recorded messages therefrom having matching content that are sequenced at the parent device directly prior to the child device;
 optimizing the linkage graph by eliminating or reducing branching nodes that connect one node to multiple other nodes;

In a real-time online phase, for each new recorded message:
 identifying a node representing a network communication device uniquely identified in the new message;
 tracing a communication pathway along edges of the optimized linkage graph by linking a sequence of nodes that connect sequential pairs of child-parent nodes extending from the identified node to a root node; and simultaneous to linking each node to the identified node, accumulating a network traffic metric for the linked node to the network traffic metric for the new recorded message.

2. The method of claim 1 comprising inputting the linked network traffic metrics into a machine learning model to output an altered linkage graph with an altered arrangement of nodes and edges that is predicted to improve network traffic metrics.

3. The method of claim 2 comprising inputting the altered linkage graph into one or more network routers or gateways to automatically alter the communication paths of the plurality of network communication devices to follow communication paths represented by the altered arrangement of nodes and edges.

4. The method of claim 2, wherein the altered linkage graph is optimized to alter the communication paths to reduce hot spots or bottlenecks of network traffic at network communication devices.

5. The method of claim 2, wherein the altered linkage graph is optimized to reduce underperforming nodes representing network communication devices with substandard latency.

6. The method of claim 2, wherein accumulated network traffic metrics are used to assign weights to the altered linkage graph configured for optimal flow to rebalance network traffic.

7. The method of claim 1 comprising iteratively repeating the offline phase to update the graph by a new set of tapped recorded messages.

8. The method of claim 1 comprising:
if the communication pathway does not branch at a node, linking the node by following a unique pointer to a single parent node;
if the communication pathway branches at a node to multiple other parent nodes indicated by a multi-node pointer thereto, linking the node by retrieving from a lookup table a unique pointer to a single parent node; and
if a node can not be associated with a single parent node, searching all potential parent nodes in the linkage graph for recorded messages with matching content that are sequenced at the parent device directly prior to the device associated with the node.

9. The method of claim 1, wherein the network traffic metrics are selected from the group consisting of: a number of nodes and edges the transmission traversed, message size, message latency associated with the identified node's single parent node, total latency as a sum of latencies associated with the sequence of linked nodes extending along the traced communication pathway extending from the identified node to the root node, and classification or priority of the recorded message associated with the identified node's linked node or root node.

10. The method of claim 1 comprising, in the linkage graph, replacing edges with nodes, such that each node represents the potential direct communication path from a parent device to a child device, and connecting the nodes with edges sequencing the potential direct communication paths.

11. A system for tracking network communication in a multi-protocol network, the system comprising:

one or more memories configured to store record communication messages recorded by tapping communication circuits in the multi-protocol network; and one or more processors configured to:
in an offline phase:
generate a linkage graph representing network communication pathways comprising generating an initial candidate arrangement of a plurality of nodes each representing a distinct network communication device uniquely identified in the recorded messages and generating a plurality of edges each connecting a pair of parent-child nodes representing a potential direct communication path from a parent device to a child device identified by recorded messages therefrom having matching content that are sequenced at the parent device directly prior to the child device, and optimize the linkage graph by eliminating or reducing branching nodes that connect one node to multiple other nodes, and In a real-time online phase, for each new recorded message:

identify a node representing a network communication device uniquely identified in the new message, trace a communication pathway along edges of the optimized linkage graph by linking a sequence of nodes that connect sequential pairs of child-parent nodes extending from the identified node to a root node, and simultaneous to linking each node to the identified node, accumulate a network traffic metric for the linked node to the network traffic metric for the new recorded message.

12. The system of claim 11, wherein the one or more processors are configured to input the linked network traffic metrics into a machine learning model to output an altered linkage graph with an altered arrangement of nodes and edges that is predicted to improve network traffic metrics.

13. The system of claim 12, wherein the one or more processors are configured to input the altered linkage graph into one or more network routers or gateways to automatically alter the communication paths of the plurality of network communication devices to follow communication paths represented by the altered arrangement of nodes and edges.

14. The system of claim 12, wherein the altered linkage graph is optimized to alter the communication paths to reduce hot spots or bottlenecks of network traffic at network communication devices.

15. The system of claim 12, wherein the altered linkage graph is optimized to reduce underperforming nodes representing network communication devices with substandard latency.

16. The system of claim 12, wherein the one or more processors are configured to use the accumulated network traffic metrics to assign weights to the altered linkage graph configured for optimal flow to rebalance network traffic.

17. The system of claim 11, wherein the one or more processors are configured to iteratively repeat the offline phase to update the graph by a new set of tapped recorded messages.

18. The system of claim 11, wherein the one or more processors are configured to:
if the communication pathway does not branch at a node, link the node by following a unique pointer to a single parent node, if the communication pathway branches at a node to multiple other parent nodes indicated by a multi-node pointer thereto, link the node by retrieving from a lookup table a unique pointer to a single parent node, and if a node can not be associated with a single parent node, search all potential parent nodes in the linkage graph for recorded messages with matching content that are sequenced at the parent device directly prior to the device associated with the node.

19. The system of claim 11, wherein the network traffic metrics are selected from the group consisting of: a number of nodes and edges the transmission traversed, message size, message latency associated with the identified node's single parent node, total latency as a sum of latencies associated with the sequence of linked nodes extending along the traced communication pathway extending from the identified node to the root node, and classification or priority of the recorded message associated with the identified node's linked node or root node.

20. The system of claim 12, wherein the one or more processors are configured to replace edges in the linkage graph with nodes, such that each node represents the potential direct communication path from a parent device to a child device, and connecting the nodes with edges sequencing the potential direct communication paths.

* * * * *